TIME DELAY CIRCUITS

Filed Dec. 30, 1963

INVENTOR.
WACLAW MOSINSKI

BY F. J. Pisarra

ATTORNEY

United States Patent Office 3,282,631
Patented Nov. 1, 1966

3,282,631
TIME DELAY CIRCUITS

Waclaw Mosinski, Freeport, N.Y., assignor to Allied Control Company, Inc., New York, N.Y., a corporation of New York Filed Dec. 30, 1963, Ser. No. 334,428
20 Claims. (Cl. 307—88.5)

This invention relates to time delay circuits adapted to permit actuation of a variety of operating and/or control circuits and instrumentalities at a specified time interval after the application of a suitable input or energizing voltage.

It is an object of the present invention to provide time delay circuits which are capable of producing delays of extremely short as well as extremely long duration, ranging from microseconds to as much as five minutes or more.

It is another object of the present invention to provide such time delay circuits which are highly reliable in operation over wide ranges of ambient temperatures and the reliability and effectiveness of which are not affected by changes in ambient temperature.

A more specific object of the present invention is the provision of such time delay circuits in which suitably selected semiconductor devices are associated with the charging circuit of a timing capacitor to effect each charging of the latter in two stages, the first relatively fast and the second relatively slow, and to enable temperature-caused variations in the charging rate to be compensated for.

It is also an object of the present invention to provide time delay circuits of the character indicated which are greatly simplified in construction, highly sensitive in operation, relatively inexpensive to produce and yet sufficiently sturdy to withstand the rigors of extended use under highly adverse environmental and operation conditions.

The foregoing and other objects, characteristics and advantages of the present invention will be more clearly understood from the following detailed description thereof when read in conjunction with the accompanying drawing, in which.

Figures 1, 2, 3:
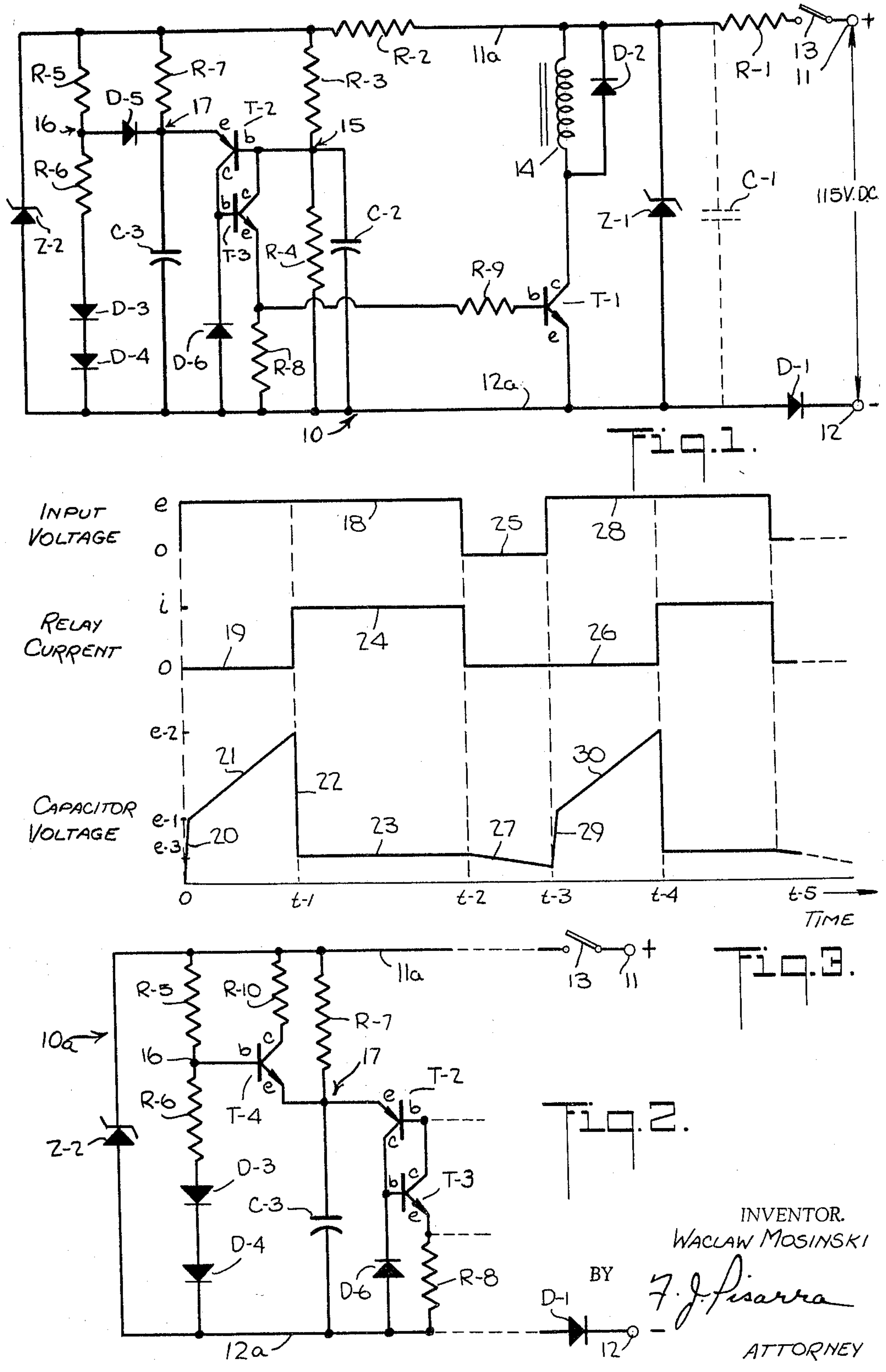
FIG. 1 is a diagram of a time delay circuit according to one embodiment of the present invention.
FIG. 2 is a fragmentary diagram of a time delay circuit similar to that of FIG. 1 but modified in accordance with another embodiment of the present invention.
FIG. 3 is a graphical representation of the operating conditions characterizing time delay circuits according to the present invention.

Referring now to the drawing in greater detail, FIG. 1 shows a time delay circuit 10 which includes a pair of input terminals 11 and 12 to which a source of D.C. energizing voltage ranging from as low as about 10 volts to as high as about 220 volts may be connected. The voltage source (not shown) may be a D.C. battery or like D.C. generating device. Merely by way of example, an actuating potential of 115 volts D.C. is indicated in FIG. 1. Connected into the positive line 11*a* of the circuit and in series with one another are an "on-off" switch 13 and two voltage-dropping resistors R–1 and R–2, while into the negative line 12*a* is inserted a semiconductor diode D–1 the function of which is to prevent any reversal of polarity in the circuit. Although it is shown only diagrammatically, the "on-off" switch 13 may be constituted by a pair of contacts of a relay or the like, or it may be an either mechanically or manually operable switch, e.g. a toggle switch or the like.

In the illustrated form of the invention, the load 14 is shown as a coil of a sensitive relay, although it could be a different electrical element or the input of an amplifying circuit adapted to energize a load of almost any size and type. The coil 14 is connected in series with the emitter-collector circuit of a normally non-conducting NPN transistor T–1 between the positive and negative lines 11*a* and 12*a*, and thus no current flows through the coil unless and until there is applied to the emitter-base circuit of the transistor a voltage sufficient to render the transistor conducting. A semiconductor diode D–2 connected across the coil serves to protect the latter against excessive voltage surges and transients. A relatively high voltage rated Zener diode Z–1 is connected across the input and in parallel with the load circuit for limiting the voltage to which the load circuit is subjected and for eliminating incidental ripple therferom.

It will be understood, of course, that alternatively the voltage source may be an A.C. generator of any desired type, yielding from about 10 to 220 volts A.C. and associated with a suitable rectifier arrangement the output of which is applied to the terminals 11 and 12 of the circuit 10. In such a case, some other precautions may be necessary to eliminate ripple and transients from the D.C. input voltage. Thus, where a 60 cycle 115 volt A.C. source is employed, a filter capacitor C–1, shown in phantom outline only, should be connected across the input in parallel with the Zener diode Z–1. If, on the other hand, a 60 cycle 24 volt A.C. source is employed, the filter capacitor C–1 may be substituted directly for the Zener diode Z–1 and both the latter and the resistor R–1 may be eliminated, since the high voltage limiting functions thereof are then not required.

The time delay generating portion of the circuit 10 comprises a pair of voltage dividers 15 and 16 connected in parallel with each other, with a relatively low voltage rated Zener diode Z–2, and with an R-C type timing circuit 17, between the positive and negative lines 11*a* and 12*a*. The voltage divider 15 is composed of two series-connected resistors R–3 and R–4, with the resistor R–4 having a transient-eliminating capacitor C–2 connected in parallel therewith, while the voltage divider 16 is composed of two resistors R–5 and R–6 and two semiconductor diodes D–3 and D–4 connected in series with one another. The timing circuit 17 is composed of a resistor R–7 and a capacitor C–3 and of certain other elements to be more fully described presently. A semiconductor diode D–5 is connected between the voltage divider 16 and the timing circuit 17, the anode of the diode D–5 being connected to the junction between the resistors R–5 and R–6, and the cathode of the said diode being connected to the junction between the resistor R–7 and the capacitor C–3.

The timing circuit 17 further comprises a pair of transistors T–2 and T–3, the former being of the PNP type and the latter of the NPN type. The emitter of the PNP transistor T–2 is connected to the junction between the resistor R–7 and the capacitor C–3 and thus to the cathode of the diode D–5. The collector of the PNP transistor T–2 is connected to the base of the NPN transistor T–3, and the collector of the latter is connected to the base of the PNP transistor T–2. The emitter of the NPN transistor T–3 is connected to the negative line 12*a* through a resistor R–8, and to the base of the load-controlling transistor T–1 through a resistor R–9. A diode D–6 is connected between the base of the transistor T–3 and the negative line 12*a*, although this diode can be omitted when the circuit will be operated only in regions of relatively low temperatures, since its sole function is to bypass the high temperature-caused current leakages of the transistors T–2 and T–3 away from the base of transistor T–3.

As will be readily understood by those skilled in the art, the illustrated PNP and NPN transistor configuration is the functional equivalent of a four-terminal semiconductor device known as a NPNP transistor and sometimes referred to as a silicon controlled switch or more simply by the initials SCS, with the emitter and base of the PNP transistor constituting, respectively, the anode and anode gate for the SCS, and with the emitter and base of the NPN transistor constituting, respectively, the cathode and cathode gate of the SCS.

The following tabulation of circuit components and parameters is given as an example of several circuit arrangements capable of producing, at various input voltages, time delays ranging from as little as 0.1 second to as much as 120 seconds.

| | | | |
|---|---|---|---|
| Input Voltage | 115 v. D.C. | 115 v. A.C. | 24 v. A.C. |
| Transistor T–1 | 2N657 | 2N657 | 2N657. |
| Transistor T–2 | 2N863 | 2N863 | 2N863. |
| Transistor T–3 | 2N706 | 2N706 | 2N706. |
| Diodes D–1 to D–4 | 1N645 | 1N645 | 1N645. |
| Diode D–5 | 1N463A | 1N463A | 1N463A. |
| Diode D–6 | 1N463 | 1N463 | 1N463. |
| Zener Diode Z–1 | UZ860 (60 v.) | UZ860 | Not used. |
| Zener Diode Z–2 | UZ815 (15 v.) | UZ815 | UZ815. |
| Capacitor C–1 | Not used | 4.7 mfd | 4.7 mfd. |
| Capacitor C–2 | 8.2 mfd | 22 mfd | 22 mfd. |
| Capacitor C–3 | (See below) | (See below) | (See below). |
| Resistor R–1 | 3.3K–1 w. | 3.3K–1 w. | Not used. |
| Resistor R–2 | 4.7K–½ w. | 4.7K–½ w. | 1K–½ w. |
| Resistor R–3 | 3K–¼ w. | 3K–¼ w. | 3K–¼ w. |
| Resistor R–4 | 6.8K–¼ w. | 6.8K–¼ w. | 6.8K–¼ w. |
| Resistor R–5 | 5.6K–¼ w. | 5.6K–¼ w. | 5.6K–¼ w. |
| Resistor R–6 | 2K–¼ w. | 2K–¼ w. | 2K–¼ w. |
| Resistor R–7 | 1M–¼ w. | 1M–¼ w. | 1M–¼ w. |
| Resistor R–8 | 10K–¼ w. | 10K–¼ w. | 10K–¼ w. |
| Resistor R–9 | 0.1K–¼ w. | 0.1K–¼ w. | 0.1K–¼ w. |

Values for C–3, which is preferably a wet tantalum capacitor, vary with timing requirements. Thus, for 0.1 to 15 seconds, a 15 mfd. capacitor is used, for 15+ to 68 seconds, a 68 mfd. capacitor, and for 68+ to 120 seconds, a 150 mfd. capacitor. C–1 and C–2 preferably are solid tantalum capacitors.

The operation of the circuit 10 in general will now be described, reference being had to FIG. 1 and also to FIG. 3.

As a starting condition it is assumed that switch 13 is open and that there is no charge on capacitor C–3, and finally that switch 13, when closed, will remain so for the time interval 0 to $t$–2. This condition is represented by the line 18 of the plot of "Input Voltage" against "Time" at the top of FIG. 3, showing the applied voltage at its operating value $e$ during this entire time interval. Concurrently, of course, the presence of the Zener diode Z–1 and the resistor R–1 ensures that no potential greater than 60 volts D.C., i.e. the rating of the Zener diode, will be applied across the load circuit. Similarly, the presence of the resistor R–2 and Zener diode Z–2 ensures that the voltage across the time delay generating portion of the circuit does not exceed about 15 volts D.C.

The initial voltage at the base of transistor T–2, i.e. at the junction between the resistors R–3 and R–4 of the voltage divider 15, is 10 volts, while the voltage at the anode of diode D–5, i.e. at the junction between the resistors R–5 and R–6 of the voltage divider 16, is 4.5 volts. As a result, the diode D–5, which will hereinafter be referred to as the control diode, is forward biased and conducts heavily, while the transistor T–2 is biased to cut-off by virtue of the fact that its base is at a positive potential with respect to its emitter. With no current flowing in transistors T–2 and T–3, transistor T–1 also remains non-conducting, and the relay coil 14 is not energized. This condition is represented by the line 19 of the plot of "Relay Current" against "Time" in the middle of FIG. 3, which shows the relay current remaining at a zero level for the interval 0 to $t$–1.

Reverting now again to the starting point ($t$=0), when switch 13 is closed, capacitor C–3 begins to charge at an extremely rapid rate determined in essence by the relatively low resistance of the resistor R–5 and the forward resistance of the control diode D–5 which effectively shunt the very high resistance R–7. This condition is represented by the line 20 of the plot of "Capacitor Voltage" against "Time" at the bottom of FIG. 3, which shows that during a very small and practically negligible fraction of the interval 0 to $t$–1, the capacitor voltage rises to a value $e$–1.

As soon as the voltage across the capacitor C–3 reaches this value ($e$–1), the control diode D–5 becomes reverse biased and stops conducting, presenting an effectively open circuit and thereby cutting resistor R–5 out of the charging circuit. The capacitor C–3 then continues to charge, but at a relatively slow rate, represented by the line 21, determined by the considerably greater resistance R–7, until the voltage across the capacitor reaches the value $e$–2 at time $t$–1. At this point, the voltage across the capacitor C–3 overcomes the reverse bias voltage established by the voltage divider 15, whereby the base-emitter circuit of transistor T–2 becomes forward biased and permits current to flow in the emitter-collector circuit of this transistor which in turn drives transistor T–3 into its conducting state, thereby providing a discharge path for the timing capacitor C–3. The voltage across the capacitor thus drops, as represented by the line 22, to a value $e$–3 which is greater than zero and essentially equal to the voltage developed across the transistors T–2 and T–3.

Concurrently, the voltage at the base of transistor T–2 drops to approximately 1 volt, since the voltage across R–4 is now much lower than initially, while the voltage at the anode of the control diode D–5 drops to about 3 volts. The diode D–5 is, consequently, again forward biased, and it together with the resistor R–5 effectively shunt resistor R–7 and provide sufficient current to hold transistors T–2 and T–3 in their conducting state. This condition continues for the interval $t$–1 to $t$–2, during which the voltage on the timing capacitor remains at the value $e$–3, as represented by the line 23, until the occurrence of a subsequent condition still to be described.

The output voltage developed across resistor R–8 during the discharge of capacitor C–3 is applied through resistor R–9 to the base of transistor T–1 and causes the latter to conduct, whereby the resultant emitter-collector current flows through the relay coil 14 and energizes the same. This condition, represented by the line 24 in the "Relay Current" plot of FIG. 3, continues until time $t$–2.

At this point, the aforesaid subsequent condition comes about, to wit the opening of the "on-off" switch 13. The applied voltage thus drops to zero, as represented by the line 25 in the "Input Voltage" plot of FIG. 3, which turns the transistors T–2 and T–3 "off" and therethrough also the transistor T–1, dropping the relay current from its value $i$ to zero and deenergizing the relay, as represented by the line 26 in the "Relay Current" plot of FIG. 3. Simultaneously therewith, the capacitor C–3 again discharges, but at a very slow rate, as represented by the line 27 in the "Capacitor Voltage" plot of FIG. 3. If the switch 13 remains open long enough, of course, the charge on the capacitor eventually drops to zero. For reasons which will presently become clear, however, it is not necessary for this to occur preparatory to the initiation of the next timing cycle.

Assuming now that after an interval $t$–2 to $t$–3 which is less than (but may be equal to or greater than) that required for the timing capacitor voltage to drop to zero, the switch 13 is again closed, the applied voltage is again at its value $e$, as represented by the line 28 in the "Input Voltage" plot of FIG. 3, whereupon during the interval $t$–3 to $t$–4 the capacitor C–3 again first charges at a rapid rate to its voltage $e$–1, as represented by the line 29, and thereafter at a slow rate to its final voltage $e$–2, as represented by the line 30, at which point the transistors T–2 and T–3 are again rendered conducting. The discharge portion of the cycle and the concurrent energization of the relay coil 14 then proceed as previously described.

It should be noted that the starting point of the slow charge (line 30) in this second timing cycle and thereafter the starting point of the slow charge in any and all subsequent timing cycles are always the same as in the initial cycle (line 21), that is to say at the voltage level *e*–1. This very important aspect of the present invention is the direct function and consequence of the presence of the diode D–5, the reverse bias characteristics of which ensure that the transistors T–2 and T–3 always start conducting at precisely the same point. Thus, even when a residual charge following a preceding timing cycle is still present on the capacitor C–3, this has no effect on the duration and accuracy of the overall timing operation. Quite to the contrary, circuits corresponding to and embodying the principles of the present invention are found to have a timing reliability within a 2% tolerance.

As previously pointed out, whenever the transistors T–2 and T–3 are conducting, the timing capacitor C–3 cannot charge to any voltage greater than the voltage developed across T–2 and T–3, and these transistors are continued in their conducting state indefinitely following the slow charge portion of each given cycle by the control diode D–5. It follows, therefore, that as long as the switch 13 is closed continuously, no new timing cycle can be initiated, i.e. that in order to initiate a new cycle the switch 13 must first be opened (prior to being closed again) to disconnect the voltage source from the circuit. It will be readily understood that although the switch 13 may be opened for an appreciable length of time, e.g. from *t*–3 to *t*–4, the same result will obtain even if the switch is opened only momentarily, for example at *t*–3, and is then immediately closed again, as might be achieved with the use of an electronic switch or even a high-speed mechanical switch.

Referring back to FIG. 1, in accordance with a further aspect of the present invention, the two diodes D–3 and D–4 in the voltage divider 16 are employed to cooperate with the diode D–5 and transistor T–2 to compensate for timing changes which might result from variations in ambient temperatures. To illustrate this compensating action, should the circuit 10 be subjected to a temperature rise, the capacitance of the timing capacitor C–3 would rise which would cause an increase of the charging time. The same temperature rise, however, decreases the voltage across the diodes D–3 and D–4 as well as across the control diode D–5 and the diode constituted by the base and emitter of the transistor T–2. The end result of these voltage decreases is to lower by a certain small amount the voltage at which the slow charge starts (*e*–1), and also to lower by a slightly greater amount the voltage at which the discharge starts (*e*–2), which cancels out the effect of the increased capacitance of the timing capacitor C–3.

In accordance with still another aspect of the present invention, the diode D–5 may be replaced by other types of semiconductor devices capable of providing the same control functions, i.e. a constant starting point for the slow charge for each cycle and a current flow during the discharge portion of the cycle sufficient to maintain the transistors T–2 and T–3 in their conducting state for as long as the input voltage is not interrupted. Merely by way of example, in the circuit 10*a* of FIG. 2, these control functions are afforded by a NPN transistor T–4 the base of which is connected to the junction between the resistors R–5 and R–6, the emitter of which is connected to the base of the transistor T–2 and to the junction between the resistor R–7 and the timing capacitor C–3, and the collector of which is connected through a resistor R–10 to the positive voltage line 11*a*. Since in all other respects the circuit 10*a* is identical with the circuit 10, a more detailed illustration thereof and description of its operation are not deemed necessary.

The time delay circuits of the present invention are highly suited for use in a great variety of operational systems, such as missile and rocket guidance, industrial manufacturing and article handling (automation), terrestrial and aeronautic vehicle control, etc., and have been found to afford both greater accuracy of delay times and less time variation over a large ambient temperature range. Moreover, these circuits admit of faster recycling without change in delay time than heretofore known circuits of this type, and they provide a more flexible and better choice of the circuit parameters which control the various switching actions, and thus they can be constructed more economically than the heretofore known time delay circuits.

While there are described and illustrated herein several preferred aspects and embodiments of the time delay circuits according to the present invention it is to be understood that the disclosure is representative only and that the said time delay circuits may be changed and modified in a number of ways, none of which involves a departure from the spirit and scope of the present invention as defined in the appended claims

Having thus described my invention, what I claim and desired to secure by Letters Patent is:

1. In a time delay circuit having incorporated therein "on-off" switch means operable to connect a source of energizing voltage to and disconnect the same from the circuit, and a time delay-determining R–C type charging circuit arranged to be energized by closing of said switch means and to provide, upon discharge, a current flow utilizable for energizing a load; the improvement comprising means connected with said charging circuit and operable upon closing of said switch means to enable an initial relatively rapid charging of the capacitor of said charging circuit to a first value and an immediately subsequent relatively slow charging of said capacitor from said first value to a second and higher value, means constituting a part of a discharge current circuit for said capacitor and responsive to the rise of the charge on said capacitor to said second value for initiating the discharge of said capacitor to a third value less than said first value but still greater than zero, and means responsive to the decrease of the charge on said capacitor to said third value for maintaining the current flow in said discharge circuit for the entire period during which said switch means is closed.

2. In a time delay circuit according to claim 1; means operatively connected with said charging circuit for compensating for changes in the capacitance of said capacitor which are the result of changes in ambient temperatures.

3. In a time delay circuit having incorporated therein "on-off" switch means operable to connect a source of energizing voltage to and disconnect the same from the circuit, and a time delay-determining R–C type charging circuit arranged to be energized by closing of said switch means and to provide, upon discharge, a current flow utilizable for energizing a load; the improvement comprising control means connected with said charging circuit and operable upon closing of said switch means to enable an initial relatively rapid charging of the capacitor of said charging circuit to a first value and an immediately subsequent relatively slow charging of said capacitor from said first value to a second and higher value, and means constituting a part of a discharge current circuit for said capacitor and responsive to the rise of the charge on said capacitor to said second value for initiating the discharge of said capacitor to a third value less than said first value but still greater than zero, said control means being further operable in response to the decrease of the charge on said capacitor to said third value to maintain the current flow in said discharge circuit for the entire period during which said switch means is closed.

4. In a time delay circuit having incorporated therein "on-off" means operable to connect a source of energizing voltage to and disconnect the same from the circuit, and a time delay-determining R–C type charging circuit arranged to be energized by closing of said switch means and to provide, upon discharge, a current flow utilizable for energizing a load; the improvement comprising semiconductor control means connected with said charging circuit so as to be forward biased upon closing of said switch means to enable an initial relatively rapid charging of the capacitor of said charging circuit to a first value and so as to become reverse biased when the charge on said capacitor reaches said first value to enable an immediately subsequent relatively slow charging of said capacitor from said first value to a second and higher value, and normally non-conducting transistor means constituting a part of a discharge current circuit for said capacitor and rendered conductive in response to the rise of the charge on said capacitor to said second value, thereby to permit the discharge of said capacitor to a third value less than said first value but still greater than zero, said semiconductor control means becoming forward biased again upon the decrease of the charge on said capacitor to said third value to enable the current flow in said discharge circuit to be maintained for the entire period during which said switch means is closed.

5. In a time delay circuit according to claim 4; said semiconductor control means comprising a diode.

6. In a time delay circuit according to claim 4; said semiconductor control means comprising a transistor.

7. In a time delay circuit according to claim 4; said transistor means comprising a NPNP transistor configuration.

8. In a time delay circuit according to claim 4; said charging circuit further comprising first and second resistors connected in parallel with one another and having, respectively, a relatively low resistance and a relatively high resistance, one terminal of said capacitor being connected to said second resistor, and said semiconductor control means being connected between said first resistor and the junction terminal of said capacitor and said second resistor.

9. In a time delay circuit according to claim 4; said charging circuit further comprising first and second resistors connected in parallel with one another and having, respectively, a relatively low resistance and a relatively high resistance, one terminal of said capacitor being connected to said second resistor, said semiconductor control means comprising a diode connected between said first resistor and the junction terminal of said capacitor and said second resistor, and said transistor means having the input circuit thereof connected between said junction terminal and said voltage source and the output circuit thereof connected in parallel with said capacitor.

10. In a time delay circuit according to claim 9; means for compensating for changes in the capacitance of said capacitor resulting from variations in ambient temperatures, said compensating means comprising semiconductor diode means connected in series with said first resistor and in parallel with said capacitor.

11. In a time delay circuit according to claim 4; said charging circuit further comprising first and second resistors connected in parallel with one another and having, respectively, a relatively low resistance and a relatively high resistance, said semiconductor control means comprising a transistor having its base-emitter circuit connected between said first resistor and the junction terminal of said capacitor and said second resistor and further having its emitter-collector circuit connected in parallel with said second resistor, and said transistor means having the input circuit thereof connected between said junction terminal and said voltage source and further having the output circuit thereof connected in parallel with said capacitor.

12. In a time delay circuit according to claim 11; means for compensating for changes in the capacitance of said capacitor resulting from variations in ambient temperatures, said compensating means comprising semiconductor diode means connected in series with said first resistor and in parallel with said capacitor.

13. A time delay circuit for applying a delayed energizing voltage to a load, comprising a R–C type charging circuit, "on-off" switch means operable to connect a source of voltage to and disconnect the same from said charging circuit, means connected with said charging circuit and enabling, upon closing of said switch means, an initial relatively rapid charging of the capacitor of said charging circuit to a first value and an immediately subsequent relatively slow charging of said capacitor from said first value to a second and higher value, means constituting a part of a discharge current circuit for said capacitor and responsive to the rise of the charge on said capacitor to said second value for initiating the discharge of said capacitor to a third value less than said first value but still greater than zero, means responsive to the decrease of the charge on said capacitor to said third value for maintaining the current flow through said discharge circuit for the entire remainder of the period during which said switch means is closed, and means utilizing a voltage developed as a function of said current flow for effecting the connection of said voltage source to said load to energize the same.

14. A time delay circuit for applying a delayed energizing voltage to a load, comprising a R–C type charging circuit, "on-off" switch means operable to connect a source of voltage to and disconnect the same from said charging circuit, control means connected with said charging circuit and operable, upon closing of said switch means, to enable an initial relatively rapid charging of the capacitor of said charging circuit to a first value and an immediately subsequent relatively slow charging of said capacitor from said first value to a second and higher value, means constituting a part of a discharge current circuit for said capacitor and responsive to the rise of the charge on said capacitor to said second value for initiating the discharge of said capacitor to a third value less than said first value but still greater than zero, said control means being further operable in response to the decrease of the charge on said capacitor to said third value to maintain the current flow in said discharge circuit for the entire period during which said switch means is closed, and means utilizing a voltage developed as a function of said current flow for effecting the connection of said voltage source to said load to energize the same.

15. A time delay circuit for applying a delayed energizing voltage to a load, comprising a R-C type charging circuit, "on-off" switch means operable to connect a source of voltage to and disconnect the same from said charging circuit, semiconductor control means connected with said charging circuit so as to be forward biased upon closing of said switch means to enable an initial relatively rapid charging of the capacitor of said charging circuit to a first value and so as to become reverse biased when the charge on said capacitor reaches said first value to enable an immediately subsequent relatively slow charging of said capacitor from said first value to a second and higher value, and normally non-conducting transistor means constituting a part of a discharge current circuit for said capacitor and rendered conducting in response to the rise of the charge on said capacitor to said second value, thereby to permit the discharge of said capacitor to a third value less than said first value but still greater than zero, said semiconductor control means becoming forward biased again upon the decrease of the charge on said capacitor to said third value to enable the current flow in said discharge circuit to be maintained for the entire period during which said switch means is closed, and means utlizing a voltage developed as a function of said current flow for effecting the connection of said voltage source to said load to energize the same.

16. A time delay circuit according to claim 15, said charging circuit further comprising first and second resistors connected in parallel with one another and having, respectively, a relatively low resistance and a relatively high resistance, one terminal of said capacitor being connected to said second resistor, said semiconductor control means comprising a diode connected between said first resistor and the junction terminal of said capacitor and said second resistor, and said transistor means having the input circuit thereof connected between said junction terminal and said voltage source and the output circuit thereof connected in parallel with said capacitor.

17. A time delay circuit according to claim 15, said charging circuit further comprising first and second resistors connected in parallel with one another and having, respectively, a relatively low resistance and a relatively high resistance, said semiconductor control means comprising a transistor having its base-emitter circuit connected between said first resistor and the junction terminal of said capacitor and said second resistor and further having its emitter-collector circuit connected in parallel with said second resistor, and said transistor means having the input circuit thereof connected between said junction terminal and said voltage source and further having the output circuit thereof connected in parallel with said capacitor.

18. In a time delay generator for applying a delayed energizing voltage to an output circuit having a load connected in series with a normally non-conducting first semiconductor device; a time delay generating circuit, comprising first and second voltage dividers connected in parallel with each other and said output circuit and adapted to be connected to a source of input voltage, a charging circuit connected in parallel with said voltage dividers and comprising a first resistor and a capacitor connected in series with each other, a second semiconductor device having a first terminal connected to a predetermined point of said first voltage divider and having a second terminal connected to the junction between said first resistor and said capacitor, a third semiconductor device having a first terminal connected to a predetermined point of said second voltage divider and having a second terminal connected to said junction between said first resistor and said capacitor, a second resistor connected between a third terminal of said third semiconductor device and the terminal of said capacitor remote from said junction of the latter and said first resistor, whereby said third semiconductor device and said second resistor provide a discharge path for said capacitor, and means coupling said second resistor to the input of said first semiconductor device to apply the potential developed across said second resistor during discharge of said capacitor to said first semiconductor device to drive the latter into its conducting state so as to connect said voltage source to said output circuit for energizing said load.

19. In a time delay generator according to claim 18; said first voltage divider comprising series-connected third and fourth resistors, said third resistor having a common terminal with said first resistor and a resistance value considerably lower than that of said first resistor, and said second semiconductor device comprising a diode said first terminal of which is connected to the junction terminal of said third and fourth resistors.

20. In a time delay generator according to claim 18; said first voltage divider comprising series-connected third and fourth resistors, said third resistor having a common terminal with said first resistor and a resistance value considerably lower than that of said first resistor, and said second semiconductor device comprising a transistor the base and emitter of which constitute said first and second terminals of said second semiconductor device, respectively, the emitter of said transistor being resistively coupled to said common terminal of said first and third resistors.

No references cited.

ARTHUR GAUSS, *Primary Examiner.*

S. D. MILLER, *Assistant Examiner.*